United States Patent
Mackenzie

(10) Patent No.: US 8,533,028 B2
(45) Date of Patent: Sep. 10, 2013

(54) METHOD FOR SUPPORTING ACCREDITATION OF EMPLOYEE BASED ON TRAINING

(75) Inventor: Lesley Paula Mackenzie, Kent (GB)

(73) Assignee: Accenture Global Services GmbH, Schaffhausen (CH)

( * ) Notice: Subject to any disclaimer, the term of this patent is extended or adjusted under 35 U.S.C. 154(b) by 336 days.

(21) Appl. No.: 12/361,322

(22) Filed: Jan. 28, 2009

(65) Prior Publication Data
US 2010/0191583 A1    Jul. 29, 2010

(51) Int. Cl.
*G06Q 10/00* (2012.01)
(52) U.S. Cl.
USPC .................. 705/7.42; 705/7.14; 705/7.15
(58) Field of Classification Search
USPC ............................. 705/7.11–7.42
See application file for complete search history.

(56) References Cited

U.S. PATENT DOCUMENTS

| | | | | |
|---|---|---|---|---|
| 5,823,781 A * | 10/1998 | Hitchcock et al. | ............ | 434/118 |
| 6,892,049 B2 * | 5/2005 | Phalp et al. | ............ | 434/350 |
| 7,024,154 B1 * | 4/2006 | Koepper et al. | ............ | 434/350 |
| 7,367,808 B1 * | 5/2008 | Frank et al. | ............ | 434/219 |
| 7,702,532 B2 * | 4/2010 | Vigil | ............ | 705/7.18 |
| 2002/0062242 A1 * | 5/2002 | Suzuki | ............ | 705/10 |
| 2003/0101091 A1 * | 5/2003 | Levin et al. | ............ | 705/11 |
| 2004/0014016 A1 * | 1/2004 | Popeck et al. | ............ | 434/322 |
| 2004/0111310 A1 * | 6/2004 | Szlam et al. | ............ | 705/8 |
| 2004/0115596 A1 * | 6/2004 | Snyder et al. | ............ | 434/118 |
| 2004/0241627 A1 * | 12/2004 | Delfing | ............ | 434/219 |
| 2005/0028005 A1 * | 2/2005 | Carson et al. | ............ | 713/200 |
| 2005/0181338 A1 * | 8/2005 | Ohno | ............ | 434/226 |
| 2005/0278187 A1 * | 12/2005 | Bobbitt | ............ | 705/1 |
| 2006/0031115 A1 * | 2/2006 | Eisma et al. | ............ | 705/11 |
| 2007/0192173 A1 * | 8/2007 | Moughler et al. | ............ | 705/11 |
| 2007/0195944 A1 * | 8/2007 | Korenblit et al. | ............ | 379/265.06 |
| 2008/0254425 A1 * | 10/2008 | Cohen | ............ | 434/308 |
| 2008/0299524 A1 * | 12/2008 | Murrell | ............ | 434/219 |
| 2009/0089153 A1 * | 4/2009 | Minert et al. | ............ | 705/11 |

* cited by examiner

*Primary Examiner* — Lynda Jasmin
*Assistant Examiner* — Sujay Koneru

(57) ABSTRACT

Methods, computer-readable media, and apparatuses support the accreditation of an employee based on training provided to the employee. Different employment areas are supported, including services and manufacturing. The employee's experience level and performance rating are compared with a predetermined experience duration and an acceptable performance rating, respectively, in order to determine a number of training modules and an allowed time frame to complete the number of training modules. The number of training modules is selected from a collection of training modules based on a performance indicator that is associated with the employee. When the employee has completed the number of training modules in the allowed time frame, the employee is accredited. If an employee's performance is less than a satisfactory performance rating, the employee may forfeit accreditation. Consequently, the employee must repeat the accreditation process in order to regain accreditation.

42 Claims, 8 Drawing Sheets

FIG. 6

| Key | | | | | | | | | | | | | | | | | |
|---|---|---|---|---|---|---|---|---|---|---|---|---|---|---|---|---|---|
| Accred. Session Request | | | | | | | | | | | | | | | | | |
| Completed Session | | | | | | | | | | | | | | | | | |
| Additional Modules for Development only | | | | | | | | | | | | | | | | | |

| SAP ID | Name | Client | Capability Lead | If ALIE or ALIE NG Accredited give date achieved | Accreditation Path choose 1/2/3 or 4 | Module 1 - Brown Bag (highlight in green) 1 | 2 | Module 2 - Energizing Techniques for Learning 1 | 2 | 3 | Module 3 - Virtual led Instructor Training 1 | 2 | Module 4 - Coaching | Module 5 - Cultural Diversity 1 | Module 6- Delivery Techniques 1 | 2 | Module 7 Advanced Delivery Techniques 1 | 2 | Module 8 - Best Practices 1 | 2 | Module 9 - Mentoring 1 |
|---|---|---|---|---|---|---|---|---|---|---|---|---|---|---|---|---|---|---|---|---|---|
| XXYYXX | MR/M5 Anonymous | Client A | 1 | | 1 | | | | | | | | | | | | | | | | | |
| XXYYXX | MR/M5 Anonymous | Client B | 2 | | 1 | | | | | | | | | | | | | | | | | |

603 604 605 606 607 608 609 610 611

Course Feedback Form

700

| Your Name: | |
|---|---|
| Course attended | |
| Date: | |

Rating Scale 701
*(Do not write anything here. This scale is designed to help you complete this form)*

| NA<br>Not<br>Applicable | 1<br>Completely<br>Dissatisfied<br>☹ | 2<br>Less Than<br>Satisfied | 3<br>Satisfied | 4<br>More Than<br>Satisfied | 5<br>Completely<br>Satisfied<br>☺ |
|---|---|---|---|---|---|

Please circle the appropriate response in each category which best describes your training experience.
Elaborate – as necessary - on any answer in the General Comments section on page 3.

Instructor Delivery  (Circle response)

How satisfied where you that the instructor (s) clearly communicated the learning objectives   NA  1  2  3  4  5

How satisfied were you that the course fulfilled its objectives?   NA  1  2  3  4  5

How satisfied were you with the content and range of topics covered on the course   NA  1  2  3  4  5

To what extent was there a good balance between theory and practical application of the skills covered?   NA  1  2  3  4  5

How satisfied were you with the knowledge of the instructor(s) that delivered this course?   NA  1  2  3  4  5

How satisfied were you that the instructor(s) delivering this course enabled your active participation?   NA  1  2  3  4  5

How satisfied were you with the delivery skill of the instructor(s) that delivered this course?   NA  1  2  3  4  5

Please rate your overall level of satisfaction with this course?   NA  1  2  3  4  5

FIG. 7

Course Feedback Form

800

General Comments:

Which aspect of the instructors delivery did you find most useful and why?

_____
_____
_____
_____
_____
_____
_____
_____
_____

Which parts of the instructors delivery did you find least useful, and what could they do to improve these aspects?

_____
_____
_____
_____
_____
_____
_____
_____
_____

Do you have any further comments, which would help us improve the quality of the instructor delivery this course?

_____
_____
_____
_____
_____
_____
_____
_____
_____

| Thank you for taking the time to give us this information. |
|---|

FIG. 8

METHOD FOR SUPPORTING ACCREDITATION OF EMPLOYEE BASED ON TRAINING

BACKGROUND

Business philosophy, according to prior art, emphasizes business independence, in which a business strives to provide needed goods and services within in the business itself. For example, a business traditionally supports its own education center to provide continuing education to its employees. However, this business philosophy is evolving, where a business is increasingly dependent on external sources for goods and services. There are a multitude of reasons in the marketplace for this trend resulting from economic considerations and increased specialization. A business, for example, may offer continuing education to its workforce in order to maintain its competitive advantage. In order to obtain flexibility in its workforce while controlling education costs, a business often depends on instructors from a third party to teach the courses in the continuing education program.

While the current trend is for a company to migrate sources of goods and service to outside the company, the company typically expects that the quality of the goods and services to be as good or better as when provided in-house. This expectation may require an external supplier to certify the goods and services in some fashion. Consequently, the external supplier may have obligations to insure that personnel providing the goods and services are in accordance with quality criteria.

BRIEF SUMMARY

The present invention provides methods and computer-readable media for accrediting an employee based on training provided to the employee. Different employment areas are supported, including services and manufacturing. With some embodiments, the employee may be an instructor (who teaches courses for clients and who requires training in order to be accredited in teaching the courses), an information technology specialist (who supports a company's computer and telecommunications systems), or an engineer (who designs hardware and software systems).

With another aspect of the invention, a predetermined experience duration and an acceptable performance rating are retrieved from a computer system. The employee's experience level and performance rating are compared with the predetermined experience duration and the acceptable performance rating, respectively, in order to determine a number of training modules and an allowed time frame to complete the number of training modules.

With another aspect of the invention, the number of training modules is selected from a collection of training modules based on a performance indicator that is associated with the employee. When the employee has completed the number of training modules in the allowed time frame, the employee is accredited.

With another aspect of the invention, if an employee's performance is less than a satisfactory performance rating, the employee forfeits accreditation. Consequently, the employee must repeat the accreditation process in order to regain accreditation.

With another aspect of the invention, a module group is associated with a performance indicator. Training modules are selected for the employee based on the performance indicator that characterizes the work assignment of the employee. Training modules from a related module group may be selected in order to select a sufficient number of training modules.

BRIEF DESCRIPTION OF THE DRAWINGS

The present invention is illustrated by way of example and not limited in the accompanying figures in which like reference numerals indicate similar elements and in which:

FIG. 6 shows an exemplary accreditation tracking spreadsheet in accordance with an embodiment of the invention.

FIG. 7 shows a first portion of an instructor evaluation form in accordance with an embodiment of the invention.

FIG. 8 shows a second portion of an instructor evaluation form in accordance with an embodiment of the invention.

DETAILED DESCRIPTION

Embodiments support the accreditation (certification) of an employee based on training provided to the employee. Different employment areas are supported, including services and manufacturing. For example, the employee may be an instructor (who teaches courses for clients and who requires training in order to be accredited in teaching the courses), an information technology specialist (who supports a company's computer and telecommunications systems), or an engineer (who designs hardware and software systems).

Figure 1:
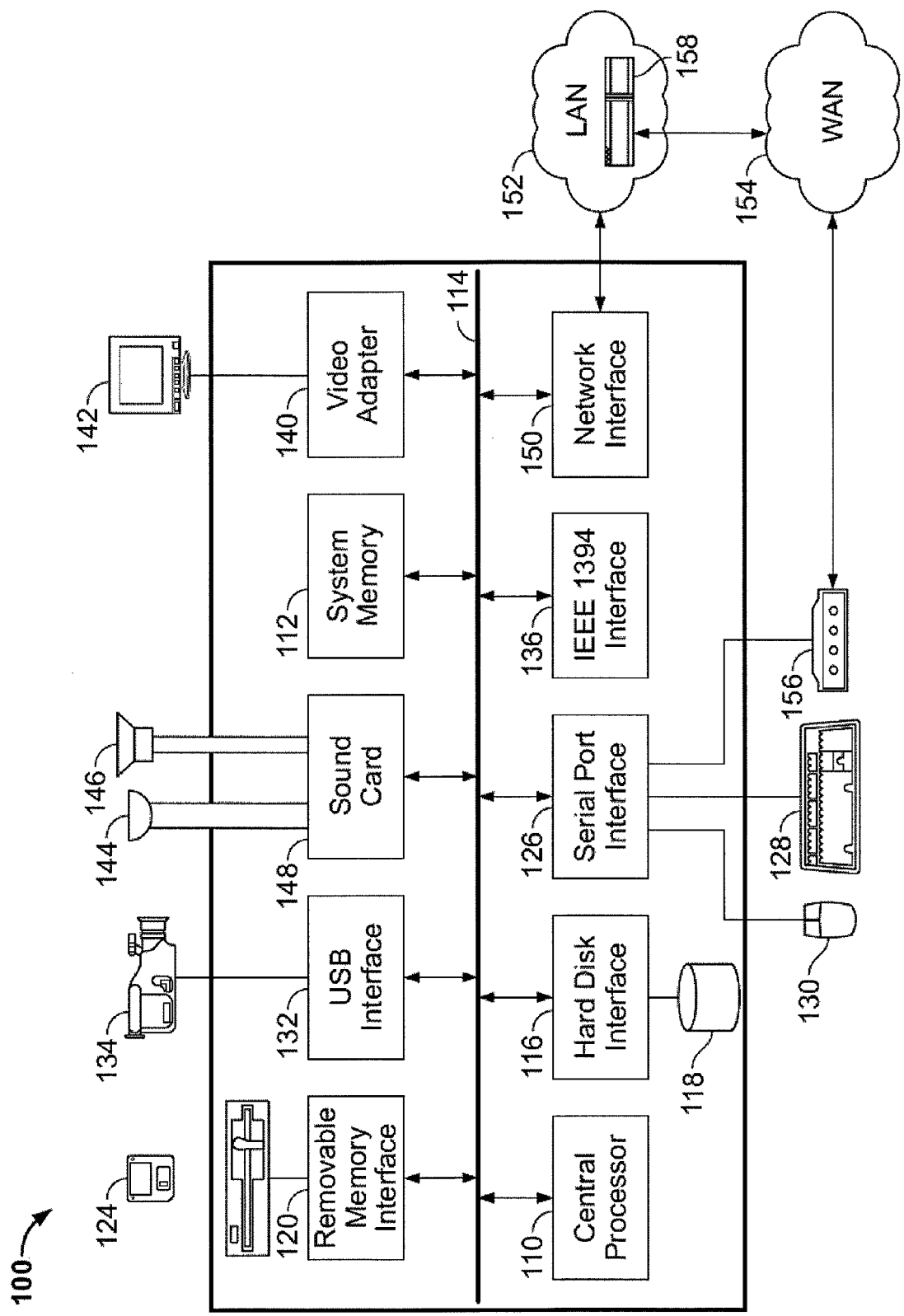
FIG. 1 shows a computer system used in an accreditation tracker system in accordance with an embodiment of the invention.
Figure 2:
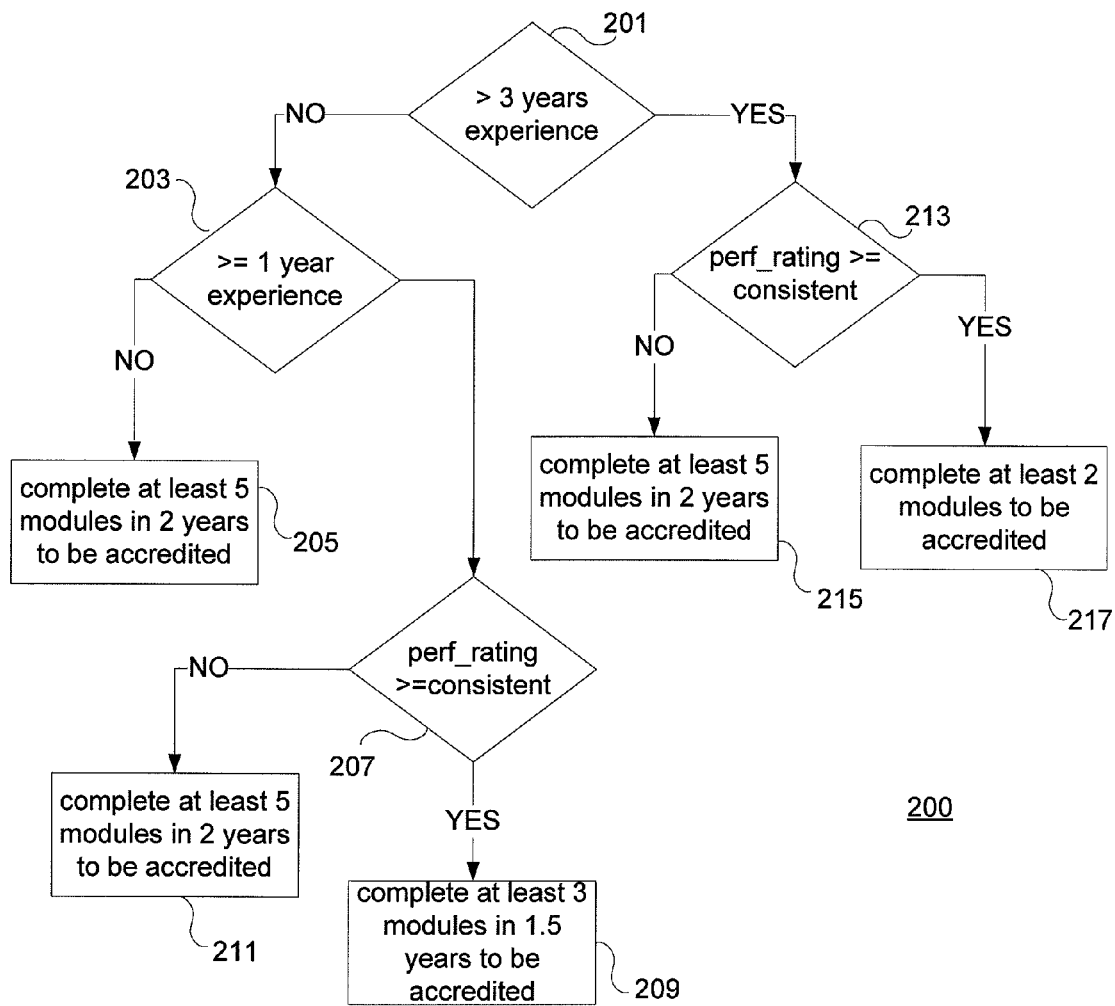
FIG. 2 shows a flow diagram for determining number of training modules necessary to accredit an instructor in accordance with an embodiment of the invention.
Figure 3:
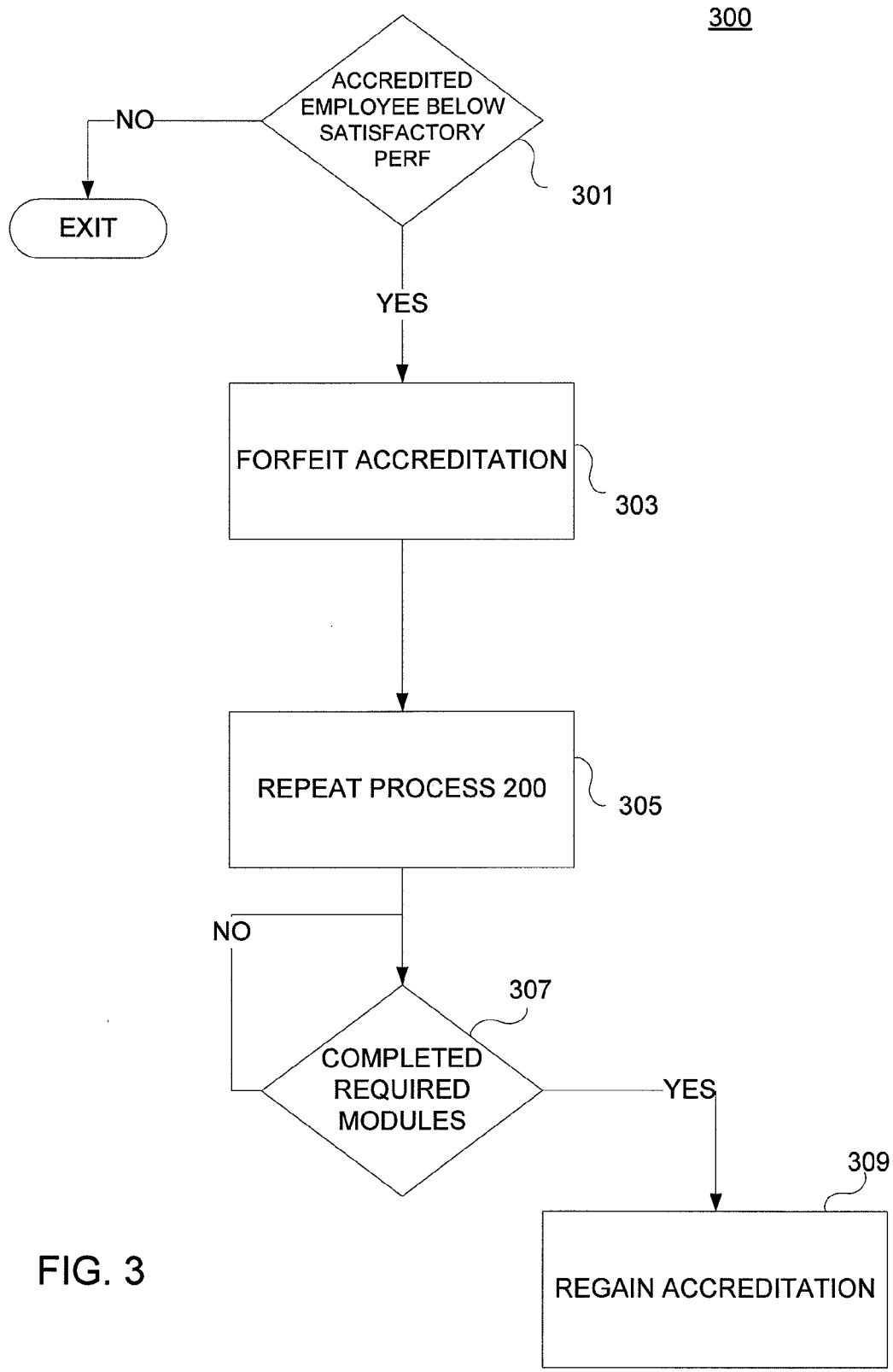
FIG. 3 shows a flow diagram when an accredited instructor forfeits accreditation in accordance with an embodiment of the invention.
Figure 4:
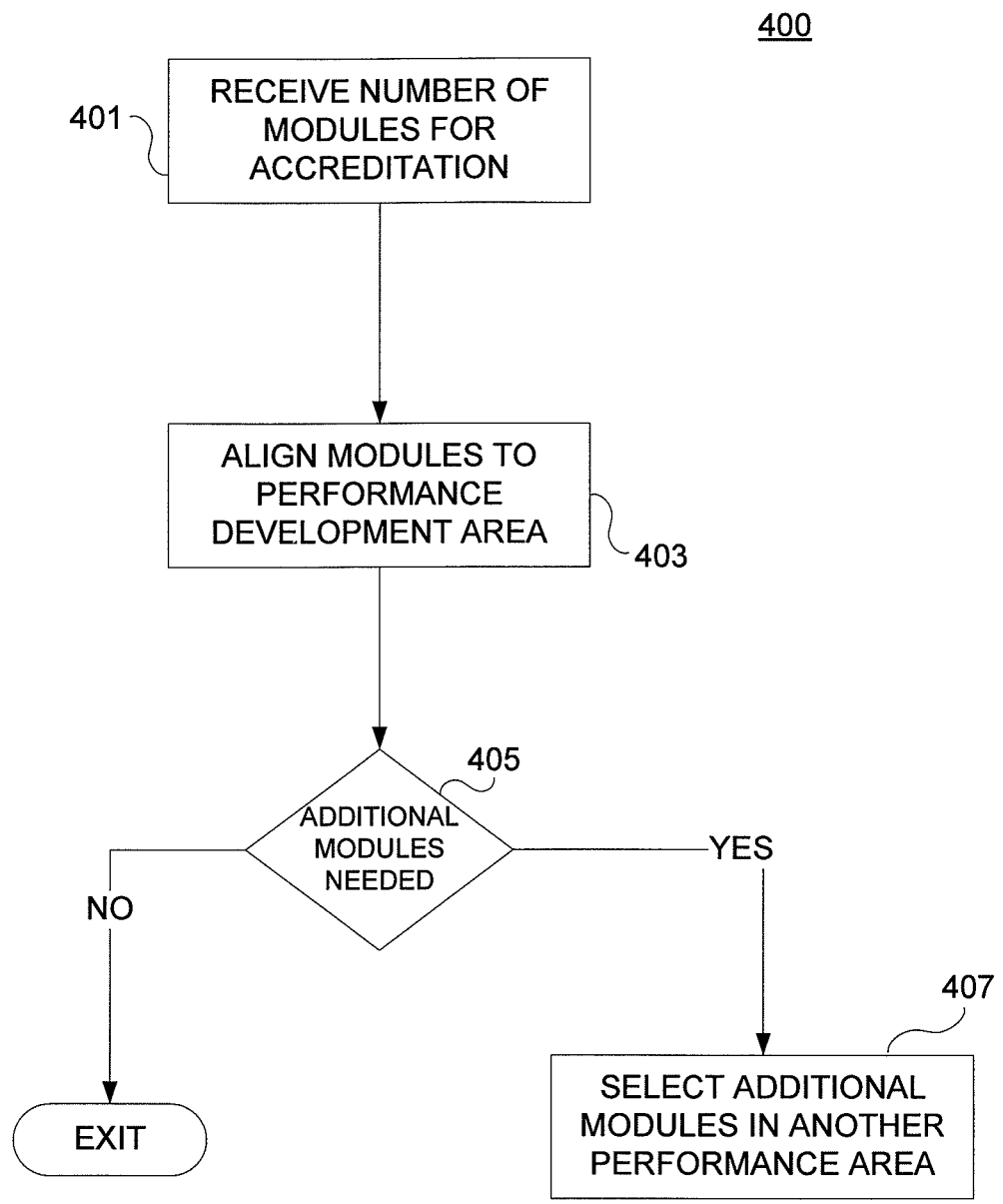
FIG. 4 shows a flow diagram for determining training modules necessary to accredit an employee (e.g., an instructor that is seeking accreditation) in accordance with an embodiment of the invention.

Elements of the present invention may be implemented with computer systems, such as the system 100 shown in FIG. 1. System 100 may execute a process (e.g. processes 200-400 as shown in FIGS. 2-4, respectively) in accordance with aspects for the invention as disclosed herein.

Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media. A storage device (e.g., hard disk drive 118) may store predetermined values that are accessed when processing a process (e.g., process 200, 300, or 400) when executing program data.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

FIG. 2 shows flow diagram 200 for determining number of training modules necessary to accredit an instructor (employee) in accordance with an embodiment of the invention. While flow diagram 200 supports the accreditation of instructors, embodiments support the accreditation (certification) of an employee in different areas of business that include services and manufacturing as previously discussed.

With the exemplary scenario shown in FIG. 2, even though the instructor teaches courses to train clients, the instructor may be required to complete training modules in order to obtain accreditation for teaching those courses. An instructor follows one of different possible accreditation paths. With a first path, an instructor with more than 3 years delivery experience (as determined by step 201) and who are demonstrating a delivery performance level that is consistent or higher with the instructor's peer group (as determined by step 213), is required to complete a minimum of 2 training modules in 1 year to become accredited (corresponding to step 217). With a second path, an instructor with 1-3 years experience (as determined by steps 201 and 203) and who is demonstrating a delivery performance level that is consistent or higher with the instructor's peer group (as determined by step 207), is required to complete a minimum of 3 training modules in 18 months to become accredited (corresponding to step 209). With a third path, an instructor with less than 1 year experience is required to complete at least 5 training modules within 2 years (corresponding to step 205). With a fourth path, an instructor whose delivery performance is lower than consistent with the instructor's peer group is required to complete at least 5 training modules within 2 years (corresponding to steps 211 and step 215).

Determining whether an instructor has completed a training module may be based on different criteria. For example, an instructor may be given credit for completing a training module merely by the instructor attending all the sessions of the training module. With other embodiments, a different criterion may be used, e.g., passing an examination that tests the instructor's understanding of concepts that were presented in the training module.

FIG. 3 shows flow diagram 300 when an accredited instructor forfeits accreditation in accordance with an embodiment of the invention. If an accredited instructor's performance falls below satisfactory as determined by step 301, the instructor forfeits accreditation in step 303. Consequently, the instructor needs to repeat process 200 (as shown in FIG. 2) in step 305 in order to regain accreditation. When the instructor has completed the required training modules as determined by step 307, the instructor is reaccredited in step 309.

FIG. 4 shows flow diagram 400 for determining training modules necessary to accredit an employee (e.g., an instructor that is seeking accreditation) in accordance with an embodiment of the invention. With an embodiment, training modules are presented through a virtual training approach. Each training module is typically presented at remote sites at scheduled times. In order to complete the training module, the employee must participate during the entire training module. However, with other embodiments the instructor must pass a test to demonstrate mastery of the material in the module.

Based on process 200, step 401 receives the number of training modules that the instructor must complete in order to be accredited. Step 403 aligns training modules based on a performance indicator (corresponding to a performance development area) associated with the instructor in order for the instructor to be accredited. Training modules may be grouped according to different performance indicators, which correspond to the instructor's teaching responsibility. An instructor may teach courses that are directed to different client audiences (e.g., managers, technical personnel, or executives). For example, performance indicators may include a business operator, a value creator, or a people developer based on the intended audience of the courses taught by the instructor. Moreover, the instructor may have more than one performance indicator if the instructor teaches courses spanning a plurality of different client audiences.

If the number of training modules that are associated with the instructor's performance indicator is less than the number specified by process 200, training modules corresponding to related performance indicators may be selected in steps 405 and 407. For example, as shown in FIG. 2, an instructor with less than 1 year of experience is required to complete at least 5 training modules in 2 years in order to be accredited. If the instructor is characterized by a performance indicator having less than 5 courses, the instructor may be required to take training modules that are associated with related performance indicators.

If an instructor is characterized by more than one performance indicator, training modules from the plurality of associated performance indicators may be selected for the instructor in order to be accredited.

In order to obtain accreditation, the instructor (employee) completes training modules from a set (collection) of modules in order to obtain accreditation. Training modules are typically categorized in one of a plurality of module groups (sets) based on specific performance development areas. For example, performance development areas are partitioned into business operator, value creator, and people developer. The business operator development performance area includes the brown bag module and the virtual instructor led training module. The value creator development performance area includes the cultural diversity module and the best practices module. The people developer development performance area includes the energizing techniques for learning module, coaching module, delivery techniques module, advanced techniques module, and mentoring module.

With the brown bag training module, information and knowledge are conveyed in various formats. A "brown bag" is a common, relatively informal knowledge exchange that often occurs during lunch time. "Brown bags" range in formality from impromptu brainstorming to highly structured "Lunch and Learn" sessions. With the completion of the training module, the participant (instructor being accredited) is expected to understand the definition and purpose of a brown bag and how it differs from other training methods, learn the key elements in designing and delivering a brown bag session, discuss considerations of communicating and marketing a brown bag, and design and deliver a brown bag session.

With the energizing techniques for learning training module, the instructor participates in an interactive session that is designed to add to an instructor's tool kit of energizing techniques that can be used in a classroom setting to enhance participant engagement. This training module incorporates many activities so the participants can learn, practice, and share experiences with other participants. The training module presents topics that include an understanding classroom energy, safety, and how to facilitate activities. There are typically a wide range of activities from "Icebreakers" and "Getting to Know You" to more advanced "Teambuilding and Communication" exercises.

The virtual instructor led training (vILT) training module provides an introduction in delivering virtual led instructor courses. The first session covers the general techniques of virtual led instruction are covered. The second session covers the tools for the delivery of a vILT course.

The coaching training module provides a workshop that focuses on situations where instructors are required to coach others on an individual (one-to-one coaching) and in a facilitative way within groups. The workshop looks at techniques for enhancing instructors existing skill levels in: listening, building rapport, empathizing, questioning, challenging, adapting style and approach to others needs, giving and receiving feedback. The workshop is very interactive and practical in nature, and is intended to be delivered face to face wherever practical. After completing the training module, the instructor is expected to be able to state what coaching is, how it differs from teaching, and its benefits and typical situations in which it would be appropriate to adopt a coaching style. In addition, the training module enables the instructor to identify the beliefs, skills and characteristics of an effective coach, develop their ability to read other people's reactions, empathize with them and adapt their style to other needs, develop their skills in building rapport, listening, questioning and challenging others, and develop their skills in giving and receiving feedback effectively.

The cultural diversity training module helps instructors develop the skills to effectively interact with cross cultural issues when delivering training to a global audience. There is an opportunity to reflect and discuss within the group the ground-rules of effective cross cultural communication Instructors can then apply the learning and identify possible solutions for the day-to-day issues that may occur when teaching abroad. The second part of the module offers practical guidance by reviewing tools that assist instructors in information gathering about different countries and learn about the relevant cultural backgrounds.

The delivery techniques training module provides an introduction into the basic presentation techniques using the presentation triangle to ensure that instructors consider three key areas within their delivery, which are audience, subject and speaker, to enable them to produce effective presentations. The module then builds on the three key areas, discussing each in more depth and how the instructors can use different skills and techniques to best advantage.

The advanced techniques training module builds on the delivery techniques module to cover the areas of questioning and productively coping with difficult course participants. This module looks at six styles of questioning and how each type of question can assist the instructor in gaining audience participation. The training module also explores how to effectively respond to delegates answers. The module then looks at several techniques to assist the instructor when they come across unwelcome participation this is covered within the module on handling difficult participants.

The best practices training module incorporates training standards and the connection between the global standards and instructor best practices and competencies. The module gives instructors a clear understanding of the expectations the company requires from all instructors and the techniques to assist all instructors in achieving the standards.

The mentoring training module provides information and knowledge on mentoring and the importance of mentoring in the development of people. This module includes discussion, best practices and role playing. The module gives instructors a clear understanding of what is mentoring, the role of a mentor and the role of a protégée (mentee), the importance of mentoring for employee development, and a process to achieving results in mentoring. The module also allows instructors to practice and role play mentoring situations.

In general, a performance indicator is related to an employee's (e.g., an instructor's) job responsibility or job assignment. For example, technical personnel may be required to take technically-related training modules, a manager may be required to take training modules associated with people development, and an executive may be required to take training modules related to business enhancement.

Figure 5:
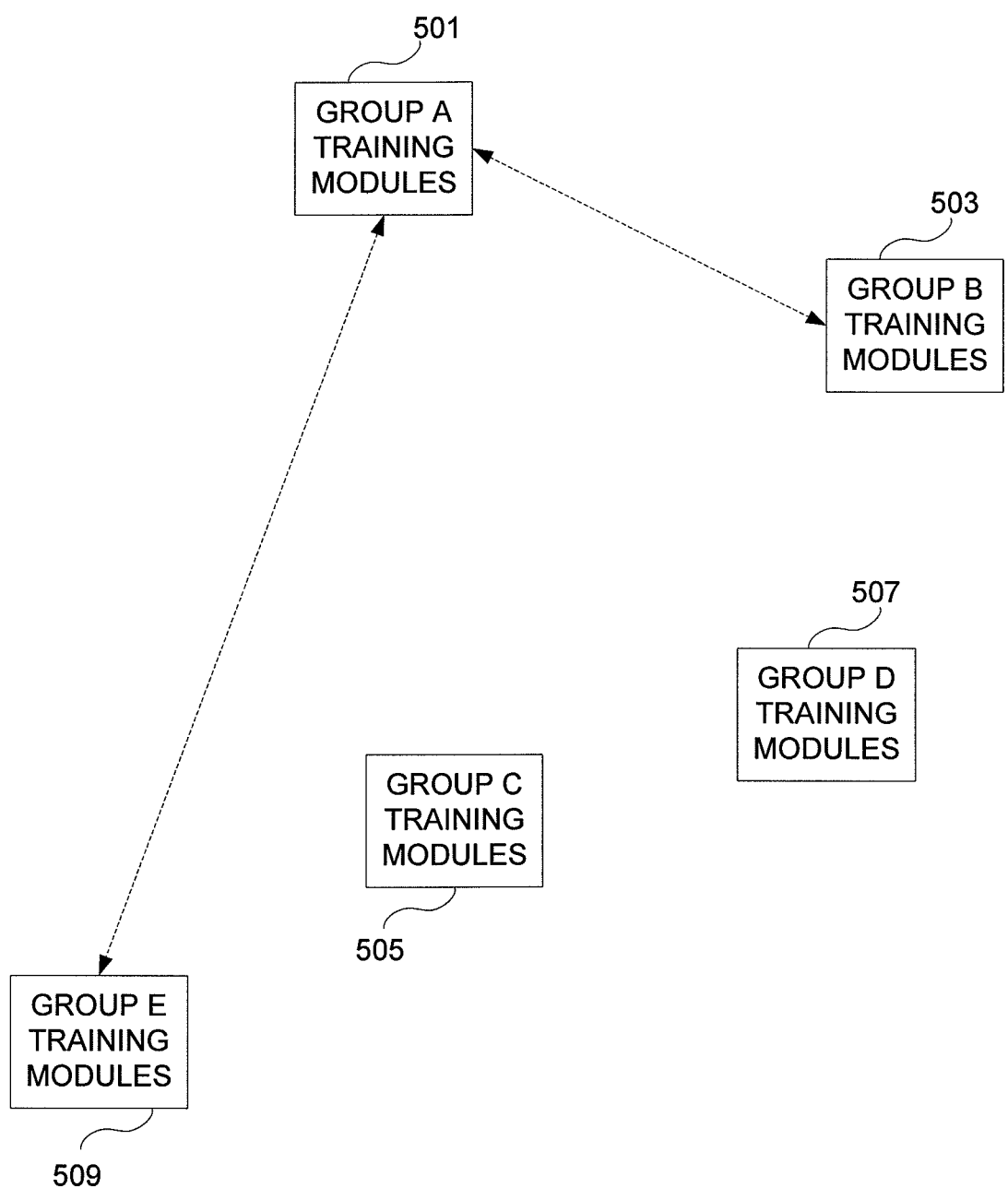
FIG. 5 shows a collection of training module groups in accordance with an embodiment of the invention.

FIG. 5 shows a collection of training module groups in accordance with an embodiment of the invention. With the exemplary embodiment, training modules are associated with module groups 501, 503, 505, 507, and 509. As previously discussed, each module group is associated with a performance indicator. Moreover, a module group may be related to another module group. For example, module group 501 is related to module group 509 and module group 503. While not explicitly shown, relationships between module groups may have different degrees of group relationships (e.g., weak, strong, and very strong) so that additional training modules (corresponding to step 407 as shown in FIG. 4) may be selected based on the degree of group relationships.

FIG. 6 shows exemplary accreditation tracking spreadsheet 600 in accordance with an embodiment of the invention. Instructors are scheduled to attend different training modules 603-611 in order to obtain accreditation as determined by processes 200 and 400. For example in entry 601, the instructor is required to complete modules 605 (module 3—"Virtual Led Instructor Training") and 608 (module 6—"Delivery Techniques") in order to be accredited. (Referring to process 2 as shown in FIG. 2, the instructor has more than 3 years of experience with a performance rating that is consistent or better and who is categorized as a "people developer.") The instructor has completed training module 608 and is scheduled to take training module 605.

FIG. 7 shows first portion 700 of an instructor evaluation form in accordance with an embodiment of the invention. The evaluation form is typically submitted by participants who have completed a course that is taught by the instructor. The participant selects a value from rating scale 701 for each question in evaluation portion 700. With some embodiments, the instructor's performance rating is determined (either fully or partially) from the rating scores submitted by course participants.

FIG. 8 shows second portion 800 of the instructor evaluation form in accordance with an embodiment of the invention. While the responses from portion 800 do not typically affect the instructor's performance rate, the responses may provide valuable feedback to the instructor so that the instructor can improve future course presentations and consequently improve future evaluation ratings in portion 701.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-assisted method comprising:
retrieving at a processor a predetermined experience duration and an acceptable performance rating corresponding to a work assignment of an employee from a computer system;
comparing at the processor an employee experience level corresponding to the work assignment with the predetermined experience duration and an employee performance rating with the acceptable performance rating;
based on the comparing, determining plurality of training modules categorized among a plurality of developmental areas and associated with a plurality of module groups based on the employee performance rating and an allowed time frame for the employee to complete the plurality of training modules to achieve accreditation in a developmental area corresponding to the work assignment; and
determining whether the employee has achieved accreditation in the developmental area based on whether the employee has completed the plurality of training modules in the allowed time frame,
wherein the plurality of training modules and the allowed time frame for an employee to complete the plurality of training modules is adjusted based on at least one of: the employee performance rating relative to a peer group of the employee; and the employee experience level relative to the predetermined experience duration,
wherein a module group of the plurality of module groups has a relationship with another module group of the plurality of module groups,
further wherein a relationship between a module group and another module group of the plurality of module groups corresponds to a degree of a pre-specified plurality of degrees comprising: a degree indicative of a weak relationship between two or more module groups; a degree indicative of a strong relationship between two or more module groups; and a degree indicative of a very strong relationship between two or more module groups.

2. The method of claim 1, further comprising:
based on a performance indicator, selecting at the processor the number of training modules from a collection of training modules; and
setting an accreditation indication in the computer system when the employee has completed the number of training modules in the allowed time frame, wherein the accreditation indication is indicative that the employee is accredited.

3. The method of claim 1, the method further comprising:
equating the number of training modules to a first number when the employee experience level is not less than the predetermined experience duration and the employee performance rating is not less than the acceptable performance rating.

4. The method of claim 1, the method further comprising:
equating the number of training modules to a second number when the employee experience level is not less than the predetermined experience duration and the employee performance rating is less than the acceptable performance rating.

5. The method of claim 1, the method further comprising:
equating the number of training modules to a third number when the employee experience level is less than the predetermined experience duration and the employee performance rating is not less than the acceptable performance rating.

6. The method of claim 1, the method further comprising:
equating the number of training modules to a fourth number when the employee experience level is less than the predetermined experience duration and the employee performance rating is less than the acceptable performance rating.

7. The method of claim 2 further comprising:
retrieving a satisfactory performance rating from the computer system; and
clearing the accreditation indication for the employee when the employee performance rating is less than the satisfactory performance rating.

8. The method of claim 7, further comprising:
repeating the comparing and the determining;
based on the performance indicator, selecting the number of training modules from the collection of training modules; and
resetting the accreditation indication for the employee when the employee has completed the number of training modules in the allowed time frame.

9. The method of claim 2, wherein the selecting comprises:
associating the performance indicator with a first module group of the plurality of module groups;
characterizing a work assignment of the employee with the performance indicator; and
selecting, for the employee, training modules from the module group.

10. The method of claim 9, further comprising:
selecting other training modules from a related module group when a sufficient number of training modules from the first module group is not selected.

11. The computer-assisted method of claim 1, wherein the training modules of the number of training modules are presented to the employee through a virtual training approach.

12. The computer-assisted method of claim 11, wherein the number of training modules is led by a virtual instructor.

13. The computer-assisted method of claim 1, wherein determining a plurality of training modules comprises:
determining a plurality of training modules from a first module group;
determining a second module group based on the degree of the relationship between the first and second module groups; and
determining an additional plurality of training modules from the second module group.

14. The computer-assisted method of claim 1, wherein the determining whether the employee has achieved accreditation based on whether the employee has completed the plurality of training modules in the allowed time frame-comprises determining whether the employee has completed the number of training modules according to a plurality of criteria.

15. The computer-assisted method of claim 14, wherein a criterion of the plurality of criteria comprises whether the employee attends a plurality of sessions comprising a training module.

16. The computer-assisted method of claim 14, wherein a criterion of the plurality of criteria comprises whether the employee passes an examination indicative of the employee's understanding of a plurality of concepts presented in the training module.

17. A computer-readable storage medium storing computer-executable instructions that, when executed, causes a processor to perform a method comprising:
retrieving a predetermined experience duration and an acceptable performance rating;
comparing an employee experience level with the predetermined experience duration and an employee performance rating with the acceptable performance rating;
based on the comparing, determining a plurality of training modules categorized among a plurality of developmental areas and associated with a plurality of module groups based on the employee performance rating and an allowed time frame for the employee to complete the plurality of training modules to achieve accreditation in a developmental area;
and
setting an accreditation indication when the employee has completed the number of training modules according in the allowed time frame wherein the accreditation indication is indicative that the employee is accredited,
wherein the plurality of training modules and the allowed time frame for an employee to complete the plurality of training modules is adjusted based on at least one of: the employee performance rating relative to a peer group of the employee; and the employee experience level relative to the predetermined experience duration
wherein a module group of the plurality of module groups has a relationship with another module group of the plurality of module groups,
further wherein a relationship between a module group and another module group of the plurality of module groups corresponds to a degree of a pre-specified plurality of degrees comprising: a degree indicative of a weak relationship between two or more module groups; a degree indicative of a strong relationship between two or more module groups; and a degree indicative of a very strong relationship between two or more module groups.

18. The computer-readable medium of claim 17, said method further comprising:
equating the number of training modules to a first number when the employee experience level is not less than the predetermined experience duration and the employee performance rating is not less than the acceptable performance rating.

19. The computer-readable medium of claim 17, said method further comprising:
equating the number of training modules to a second number when the employee experience level is not less than the predetermined experience duration and the employee performance rating is less than the acceptable performance rating.

20. The computer-readable medium of claim 17, said method further comprising:
equating the number of training modules to a third number when the employee experience level is less than the predetermined experience duration and the employee performance rating is not less than the acceptable performance rating.

21. The computer-readable medium of claim 17, said method further comprising:
equating the number of training modules to a fourth number when the employee experience level is less than the predetermined experience duration and the employee performance rating is less than the acceptable performance rating.

22. The computer-readable medium of claim 17, said method further comprising:
retrieving a satisfactory performance rating; and
clearing the accreditation indication for the employee when the employee performance rating is less than the satisfactory performance rating.

23. The computer-readable medium of claim 22, said method further comprising:
based on the performance indicator, selecting the number of training modules from the collection of training modules; and
resetting the accreditation indication for the employee when the employee has completed the number of training modules in the allowed time frame.

24. The computer-readable medium of claim 17, said method further comprising:
associating the performance indicator with a module group;
characterizing a work assignment of the employee with the performance indicator; and
selecting, for the employee, training modules from the module group.

25. The computer-readable medium of claim 24, said method further comprising:
selecting other training modules from a related module group when a sufficient number of training courses is not selected.

26. The computer-readable storage medium of claim 17, wherein the determining a plurality of training modules comprises:
determining a plurality of training modules from a first module group;
determining a second module group based on the degree of the relationship between the first and second module groups; and
determining an additional plurality of training modules from the second module group.

27. The computer-readable storage medium of claim 17, wherein the setting an accreditation indication when the employee has completed the number of training modules in the allowed time frame comprises determining whether the employee has completed the number of training modules according to a plurality of criteria.

28. The computer-readable storage medium of claim 27, wherein a criterion of the plurality of criteria comprises whether the employee attends a plurality of sessions comprising a training module.

29. The computer-readable storage medium of claim 27, wherein a criterion of the plurality of criteria comprises whether the employee passes an examination indicative of the employee's understanding of a plurality of concepts presented in the training module.

30. An apparatus comprising:
a memory; and
a processor configured to retrieve instructions from the memory and to perform:
retrieving a predetermined experience duration and an acceptable performance rating;
comparing an employee experience level with the predetermined experience duration and an employee performance rating with the acceptable performance rating;
based on the comparing, determining a plurality of training modules categorized among a plurality of developmental areas and associated with a plurality of module groups based on the employee performance rating and an allowed time frame for the employee to complete the plurality of training modules to achieve accreditation in a developmental area;
and
setting an accreditation indication when the employee has completed the
number of training modules in the allowed time frame wherein the accreditation indication is indicative that the employee is accredited,
wherein the plurality of training modules and the allowed time frame for an employee to complete the plurality of training modules is adjusted based on at least one of: the employee performance rating relative to a peer group of the employee; and the employee experience level relative to the predetermined experience duration,
wherein a module group of the plurality of module groups has a relationship with another module group of the plurality of module groups,
further wherein a relationship between a module group and another module group of the plurality of module groups corresponds to a degree of a pre-specified plurality of degrees comprising: a degree indicative of a weak relationship between two or more module groups; a degree indicative of a strong relationship between two or more module groups; and a degree indicative of a very strong relationship between two or more module groups.

31. The apparatus of claim 30, wherein the processor is further configured to:
equate the number of training modules to a first number when the employee experience level is not less than the predetermined experience duration and the employee performance rating is not less than the acceptable performance rating.

32. The apparatus of claim 30, wherein the processor is further configured to:
equate the number of training modules to a second number when the employee experience level is not less than the predetermined experience duration and the employee performance rating is less than the acceptable performance rating.

33. The apparatus of claim 30, wherein the processor is further configured to:
equate the number of training modules to a third number when the employee experience level is less than the predetermined experience duration and the employee performance rating is not less than the acceptable performance rating.

34. The apparatus of claim 30, wherein the processor is further configured to:
equate the number of training modules to a fourth number when the employee experience level is less than the predetermined experience duration and the employee performance rating is less than the acceptable performance rating.

35. The apparatus of claim 30, wherein the processor is further configured to:
retrieve a satisfactory performance rating; and clear the accreditation indication for the employee when the employee performance rating is less than the satisfactory performance rating.

36. The apparatus of claim 35, wherein the processor is further configured to:
based on the performance indicator, selecting the number of training modules from the collection of training modules; and
reset the accreditation indication for the employee when the employee has completed the number of training modules in the allowed time frame.

37. The apparatus of claim 30, wherein the processor is further configured to:
associate the performance indicator with a module group;
characterize a work assignment of the employee with the performance indicator; and
select, for the employee, training modules from the module group.

38. The apparatus of claim 37, wherein the processor is further configured to:
select other training modules from a related module group if a sufficient number of training courses is not selected.

39. The apparatus of claim 30, wherein the determining a plurality of training modules comprises:
determining a plurality of training modules from a first module group;
determining a second module group based on the degree of the relationship between the first and second module groups; and
determining an additional plurality of training modules from the second module group.

40. The apparatus of claim 30, wherein the setting an accreditation indication when the employee has completed the number of training modules in the allowed time frame comprises determining whether the employee has completed the number of training modules according to a plurality of criteria.

41. The apparatus of claim 40, wherein a criterion of the plurality of criteria comprises whether the employee attends a plurality of sessions comprising a training module.

42. The apparatus of claim 40, wherein a criterion of the plurality of criteria comprises whether the employee passes an examination indicative of the employee's understanding of a plurality of concepts presented in the training module.

* * * * *